(12) United States Patent
Winandy et al.

(10) Patent No.: US 12,638,243 B2
(45) Date of Patent: May 26, 2026

(54) HEAT EXCHANGER WITH VAPOR EXTRACTORS

(71) Applicants: INDUSTRIAL ADVANCED SERVICES FZ-LLC, Ras Al Khaimah (AE); François-Mathieu Winandy, London (GB)

(72) Inventors: François-Mathieu Winandy, London (GB); Mohammed Kassem Benabderrazik, Rabat (MA); Maximilien-Paul Winandy, Saffron Walden (GB)

(73) Assignees: François-Mathieu Winandy, London (GB); INDUSTRIAL ADVANCED SERVICES FZ-LLC, Ras Al Khaimah (AE)

( * ) Notice: Subject to any disclaimer, the term of this patent is extended or adjusted under 35 U.S.C. 154(b) by 72 days.

(21) Appl. No.: 18/563,273

(22) PCT Filed: May 24, 2022

(86) PCT No.: PCT/EP2022/063959
§ 371 (c)(1),
(2) Date: Nov. 21, 2023

(87) PCT Pub. No.: WO2022/248425
PCT Pub. Date: Dec. 1, 2022

(65) Prior Publication Data
US 2024/0219127 A1 Jul. 4, 2024

(30) Foreign Application Priority Data
May 25, 2021 (BE) .................................... 2021/5420

(51) Int. Cl.
*C02F 1/04* (2023.01)
*B01D 1/04* (2006.01)
(Continued)

(52) U.S. Cl.
CPC ................. *F28D 7/16* (2013.01); *B01D 1/04* (2013.01); *B01D 1/065* (2013.01); *B01D 1/221* (2013.01);
(Continued)

(58) Field of Classification Search
CPC ........ B01D 1/0041; B01D 1/04; B01D 1/065; B01D 1/221; B01D 5/0009; B01D 5/0015;
(Continued)

(56) References Cited

U.S. PATENT DOCUMENTS

| | | | | | |
|---|---|---|---|---|---|
| 3,586,090 | A | * | 6/1971 | Henderson | C02F 1/04 |
| | | | | | 159/17.3 |
| 3,724,522 | A | * | 4/1973 | Pogson | C02F 1/08 |
| | | | | | 137/561 A |

(Continued)

FOREIGN PATENT DOCUMENTS

| | | | |
|---|---|---|---|
| FR | 2781387 A1 | 1/2000 |
| WO | 0196244 A1 | 12/2001 |

(Continued)

OTHER PUBLICATIONS

Foreign Communication from a Related Counterpart Application, International Search Report and Written Opinion dated Aug. 1, 2022, International Application No. PCT/EP2022/063959 filed on May 24, 2022.

(Continued)

*Primary Examiner* — Eric S Ruppert
*Assistant Examiner* — Hans R Weiland
(74) *Attorney, Agent, or Firm* — Conley Rose, P.C.

(57) ABSTRACT

The invention relates to an evaporator-condenser-type heat exchanger comprising a plurality of zones, each zone comprising at least one extractor means configured to channel at least a portion of the primary vapor generated in said zone (Continued)

100

200 towards the outside of the heat exchanger. The heat exchanger includes a plurality of sub-assemblies consisting in part of a layer of a thermally conductive material.

16 Claims, 7 Drawing Sheets

(51) Int. Cl.

| | |
|---|---|
| *B01D 1/06* | (2006.01) |
| *B01D 1/22* | (2006.01) |
| *B01D 5/00* | (2006.01) |
| *F28D 3/00* | (2006.01) |
| *F28D 7/16* | (2006.01) |
| *F28D 21/00* | (2006.01) |
| *C02F 103/08* | (2006.01) |

(52) U.S. Cl.
CPC ......... *B01D 5/0009* (2013.01); *B01D 5/0015* (2013.01); *B01D 5/006* (2013.01); *C02F 1/043* (2013.01); *F28D 3/00* (2013.01); *F28D 21/0015* (2013.01); *C02F 2103/08* (2013.01)

(58) Field of Classification Search
CPC ...... B01D 5/006; C02F 1/043; C02F 2103/08; F28D 3/00; F28D 7/16; F28D 9/00; F28D 21/0015; F28D 2021/0066; F28F 13/003; Y02A 20/124
See application file for complete search history.

(56) References Cited

U.S. PATENT DOCUMENTS

| | | | | |
|---|---|---|---|---|
| 3,961,658 | A | * | 6/1976 | Pagani ..................... B01D 1/26 159/17.4 |
| 4,424,098 | A | * | 1/1984 | Hartig ..................... B01D 1/30 159/13.1 |
| 4,585,523 | A | * | 4/1986 | Giddings ................. B01D 1/22 165/133 |
| 4,624,747 | A | * | 11/1986 | el Din Nasser ........... C02F 1/06 203/40 |
| 2014/0251550 | A1 | * | 9/2014 | Juul Andersen ...... F28D 9/0006 159/13.1 |
| 2017/0151507 | A1 | * | 6/2017 | El-Sayed ............. B01D 61/145 |
| 2019/0083935 | A1 | * | 3/2019 | Ong ..................... B01D 61/366 |
| 2021/0197098 | A1 | * | 7/2021 | Andersson ............. F28F 3/086 |

FOREIGN PATENT DOCUMENTS

| | | |
|---|---|---|
| WO | 2012175826 A1 | 12/2012 |
| WO | 2019020605 A1 | 1/2019 |
| WO | 2020099955 A1 | 5/2020 |
| WO | 2022248425 A1 | 12/2022 |

OTHER PUBLICATIONS

Foreign Communication from a Related Counterpart Application, Office Action dated Jan. 16, 2025, United Arab Emirates Application No. P6003040/2023 filed on Nov. 23, 2023.

\* cited by examiner

[Fig 1]
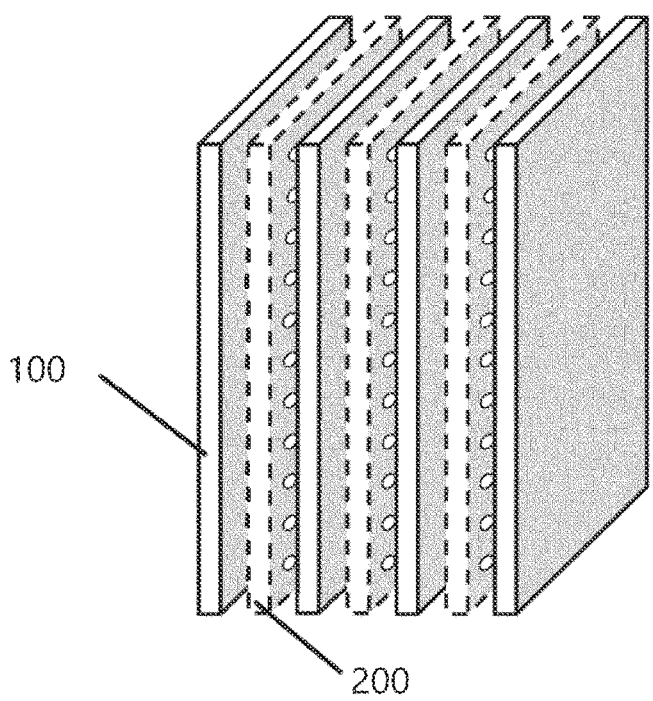
[Fig 2]
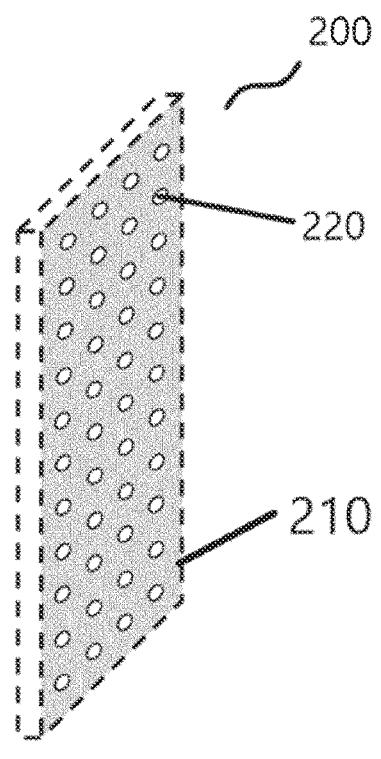

[Fig 3]
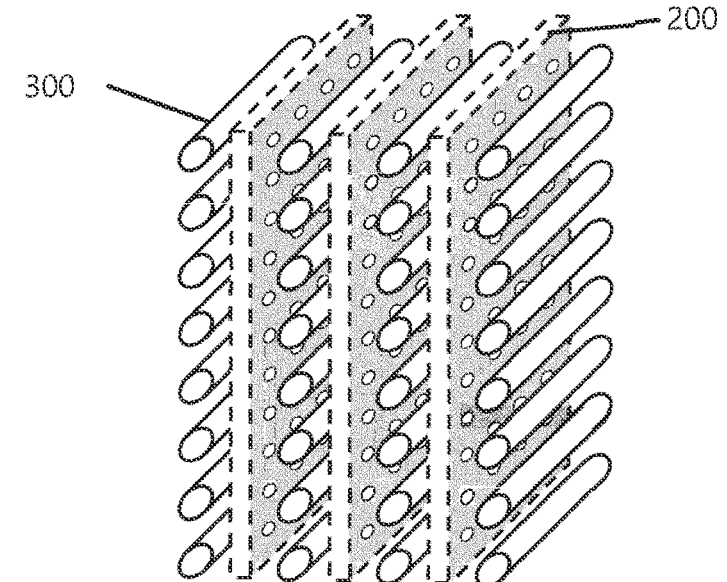
[Fig 4]
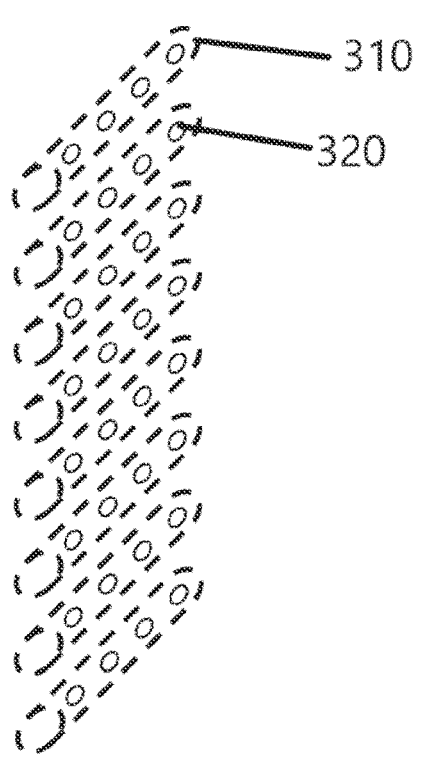

[Fig 5]
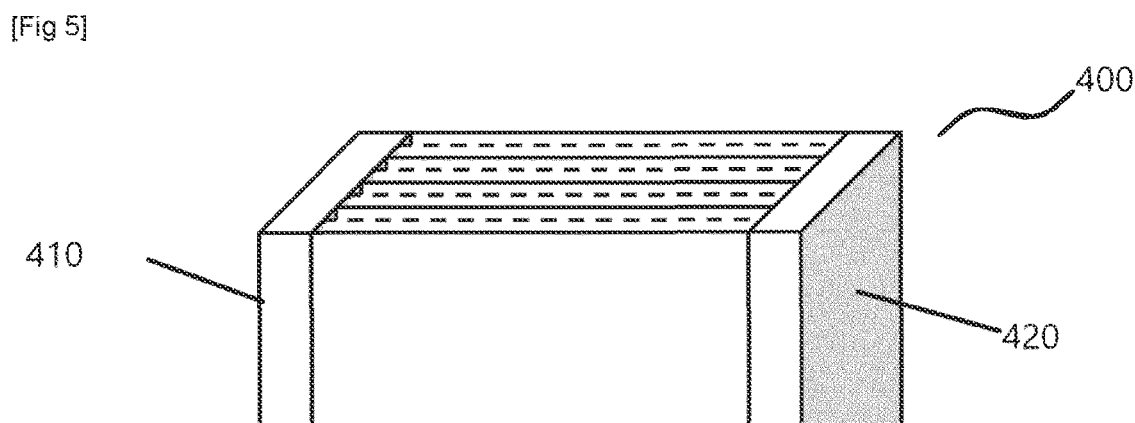
410
400
420
[Fig 6A]
[Fig 6B]
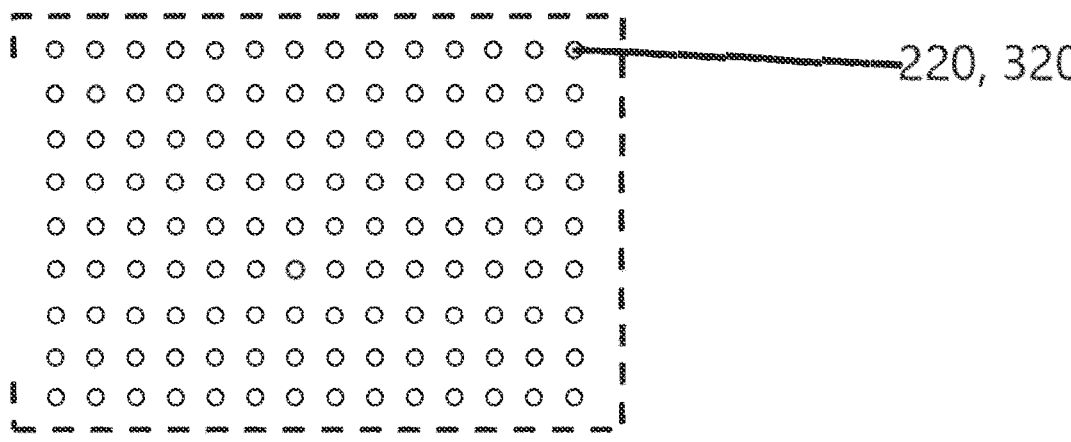
220, 320

[Fig 7]
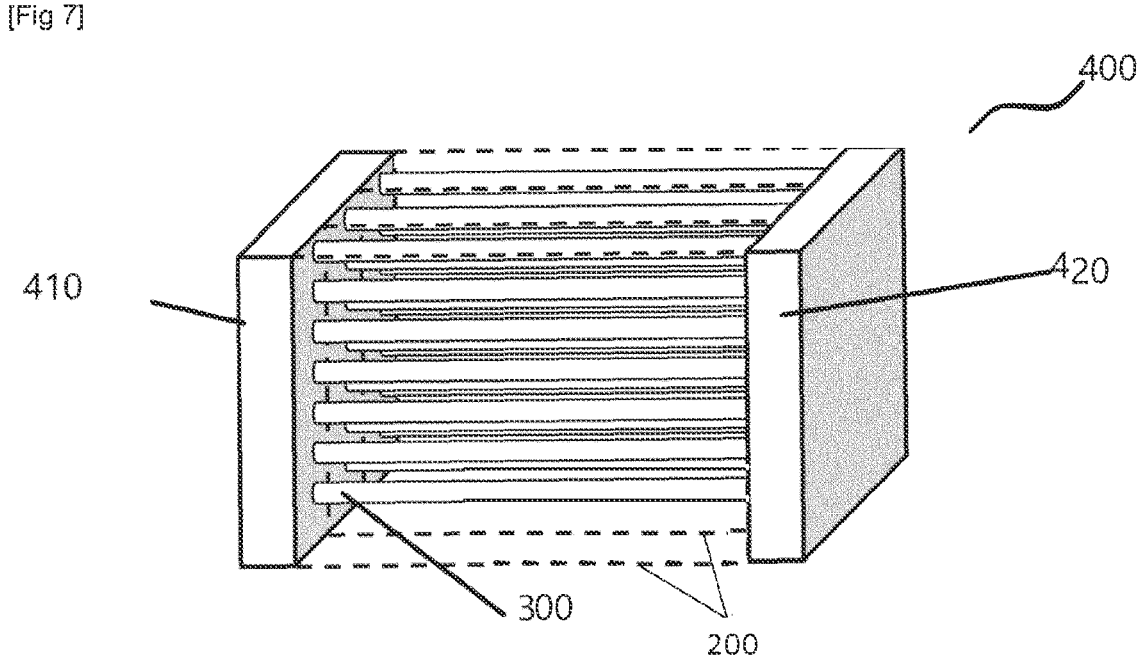
[Fig 8]
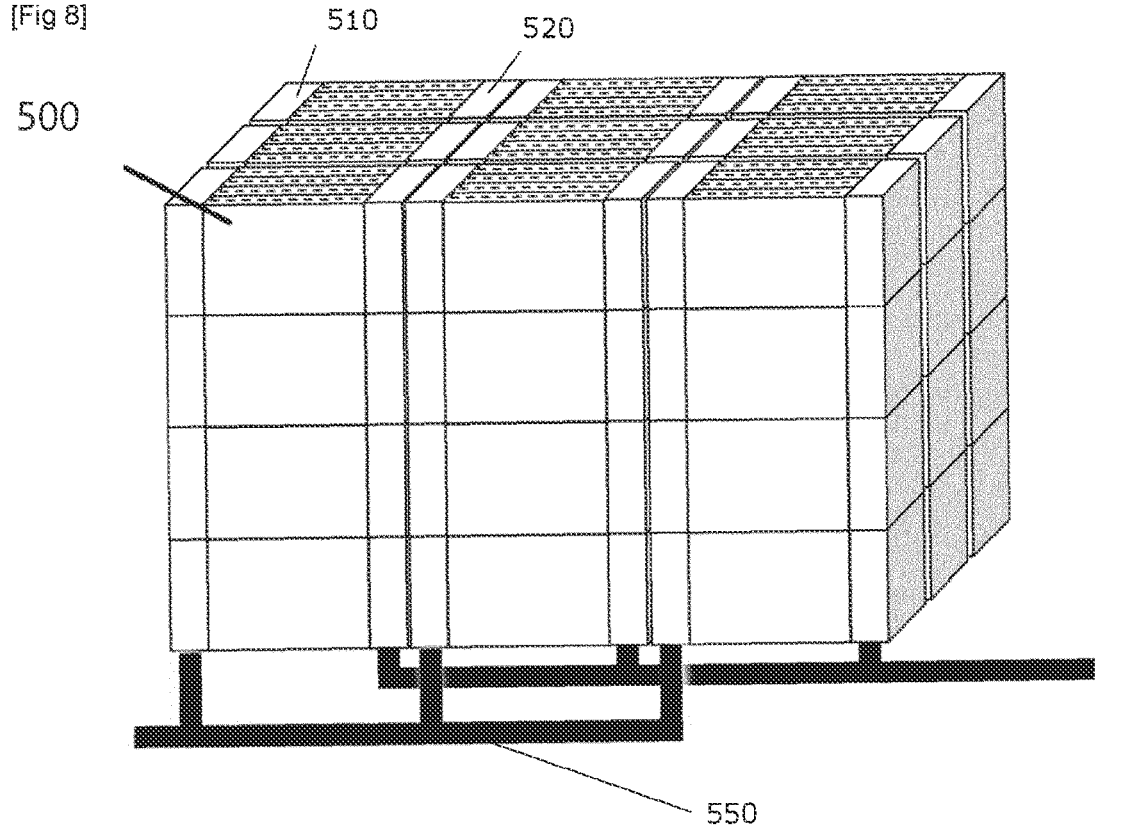

[Fig 9A]
[Fig 9B]
[Fig 9C]
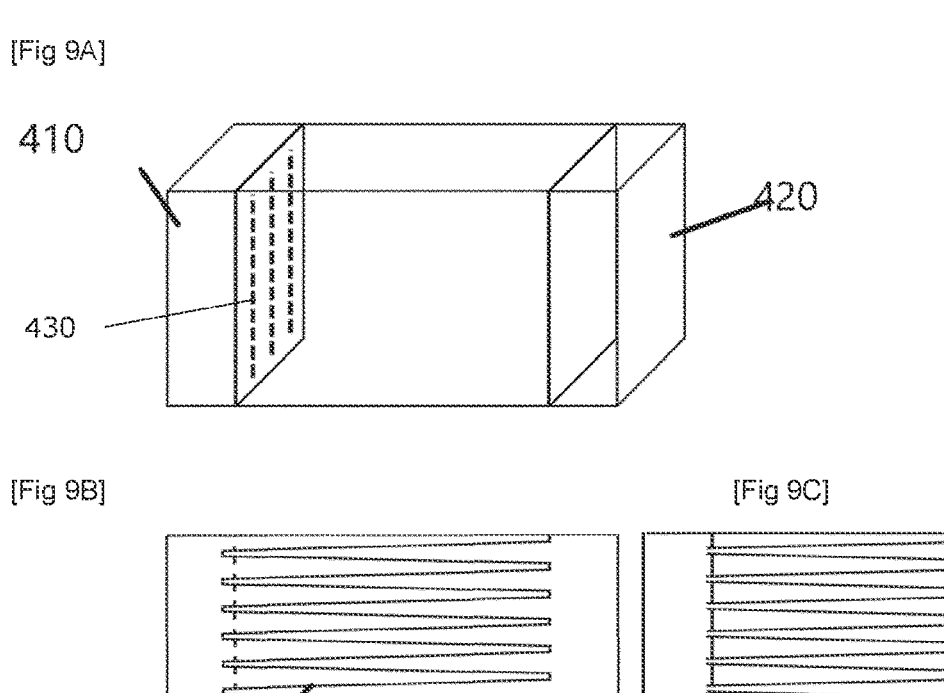
[Fig 10]
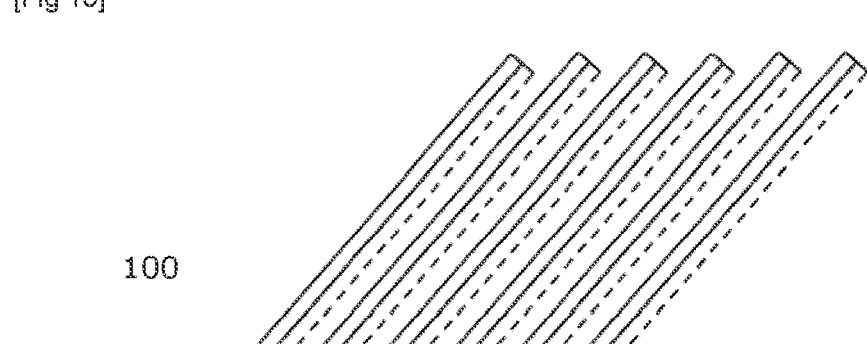

[Fig 11A]
430  430  430
500
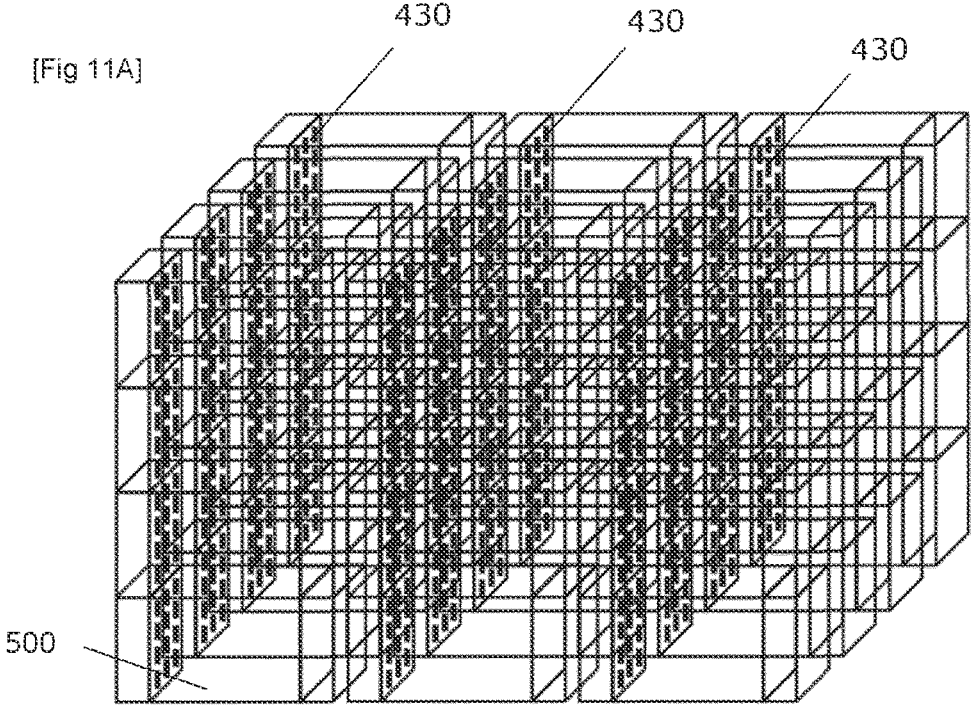
[Fig 11B]
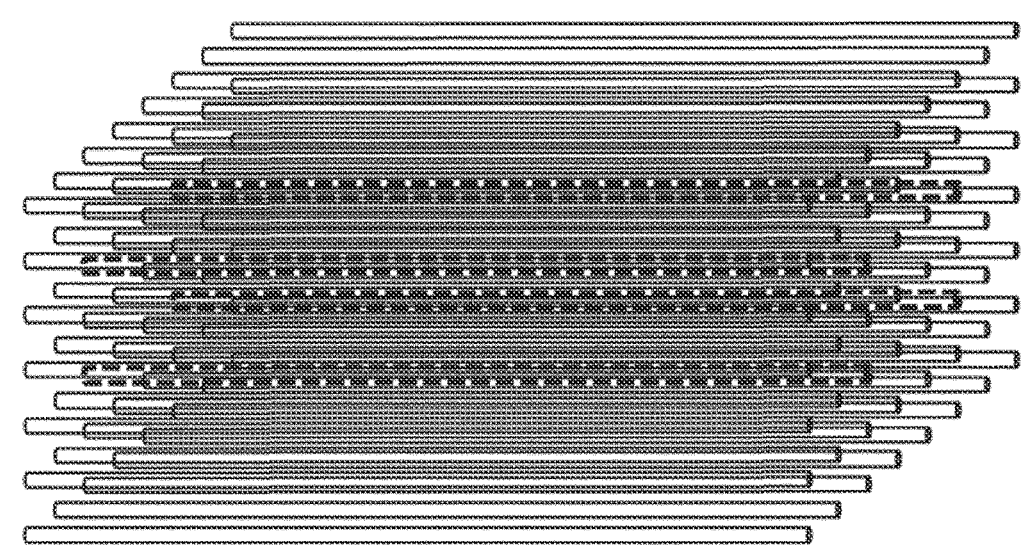

[Fig 12]
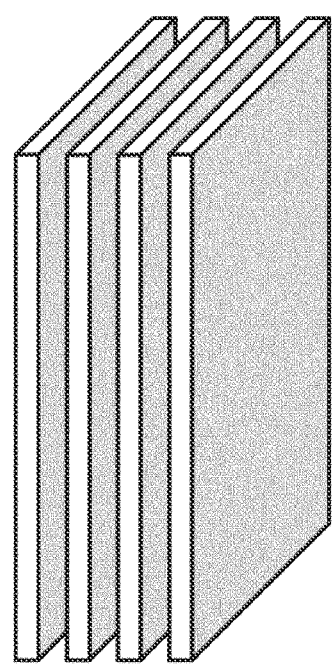
[Fig 13]
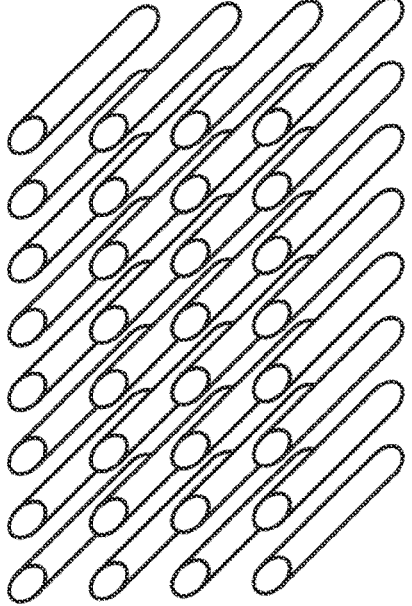

HEAT EXCHANGER WITH VAPOR EXTRACTORS

CROSS-REFERENCE TO RELATED APPLICATIONS

The present application is a filing under 35 U.S.C. 371 as the National Stage of International Application No. PCT/EP2022/063959, filed May 24, 2022, entitled "HEAT EXCHANGER WITH VAPOR EXTRACTORS," which claims priority to Belgium Application No. 2021/5420 filed with the Intellectual Property Office of Belgium on May 25, 2021, both of which are incorporated herein by reference in their entirety for all purposes.

FIELD OF APPLICATION

The present invention relates to the field of water treatment for the purposes of producing drinking water and/or water for industrial use.

For example, as water for industrial use, demineralized water, process water, or service water may be cited; in the case of drinking water, it is mainly referred to that produced by the utility companies in order to supply public or community distribution networks.

More particularly, the invention relates to water desalination processes, in particular distillation processes implementing one or more heat exchangers.

The term "heat exchanger" is understood to mean, within the meaning of the present invention, an evaporator-condenser, an evaporator-condenser exchanger, or a latent heat exchanger.

PRIOR ART

In the prior art, water desalination processes, such as processes implementing multiple-effect distillation (MED) or mechanical vapor compression (commonly referred to as the English acronym MVC) are currently known and used.

Such processes in particular make it possible to produce drinking water and/or water for industrial use by desalination by implementing a process for distillation of a liquid to be treated on at least one heat exchanger which ensures, by heat transfer, on the one hand, evaporation and, on the other hand, condensation.

For example, as liquid to be treated, seawater or brackish water can be cited. Seawater is understood to mean any water taken from the marine environment whose salt concentration is typically greater than or equal to 30 g/L. Note that brackish waters cover raw water whose salinity is between about 1 g/L and the salinity of seawater. Furthermore, brackish waters are generally water extracted from aquifers called borehole water, or mixtures of borehole water and seawater.

As liquid to be treated, industrial wastewater or household wastewater can also be considered. The product of the treatment of these waters is generally either used as water for industrial use, or reinjected into the natural environment, or, if the quality allows it, used in irrigation networks or directly diluted in drinking water networks.

In the prior art, the heat exchangers used in such processes are typically constructed in a single piece and comprise an upper part using which the liquid to be treated is introduced therein and a lower part by means of which at least one product from the treated liquid is extracted after the treatment of the liquid to be treated. Generally, the heat exchangers are characterized inter alia by an overall heat transfer coefficient, a layer assembly configuration, an exchange surface, and a form factor or volume.

It should also be noted that the heat exchangers currently used are typically installed in an enclosure that is first used as means for collecting the primary vapor. The enclosure also makes it possible to implement the condensation process at a pressure different from atmospheric pressure, and in this case the heat exchangers work at an equilibrium temperature, or vapor temperature, different from 100° C. In particular, most often and in particular in configurations that aim to reduce the energy consumption of the evaporation process, this equilibrium temperature is less than 65° C. in order, on the one hand, to reduce the problems and risks related to scaling, and on the other hand to increase the efficiency of the thermodynamic cycles of these heat exchangers.

To allow the invention to be understood, we add to the characteristics of the known heat exchangers the concept of sub-assemblies. Each sub-assembly is defined as being a portion of a given heat exchanger.

Each of the sub-assemblies of the heat exchanger comprises:

an evaporation surface which, in contact with the liquid to be treated, transfers heat to it and makes it possible to form a primary vapor, an evaporated vapor space or primary vapor space, a condensation surface which both condenses a secondary vapor into a condensate and captures latent heat from condensation, the secondary vapor being the vapor to be condensed, a vapor space to be condensed or secondary vapor space, and a layer of thermally conductive material that ensures the heat transfer, the layer of thermally conductive material being located between the evaporation surface and the condensation surface, this material being configured to transfer at least part of the latent heat of condensation from the condensation surface to the evaporation surface, the evaporation surface typically being opposite the condensation surface.

Heat transfers made by the thermally conductive materials of each of the sub-assemblies of current heat exchangers are mainly composed of latent condensation heat which is directly recovered through the thermally conductive material and which ensures the evaporation phenomenon. These heat transfers are made possible by, among other things, applying a temperature differential, and also a pressure differential, in particular, between the evaporation surface and the condensation surface of one of the sub-assemblies of the heat exchanger.

In particular, during the implementation of the condensation process, there is a distinction between two types of vapors. The primary vapor resulting from the evaporation of the liquid to be treated which propagates on the evaporation surfaces of the heat exchanger. This primary vapor circulates on the side of the evaporation surfaces in the primary vapor spaces. The secondary vapor, which is intended to be condensed on the heat exchanger, circulates on the side of the condensation surfaces of the heat exchanger, in the secondary vapor spaces. Each of the condensation surfaces is generally opposite, for a layer of thermally conductive material of the heat exchanger, to one of the evaporation surfaces of the heat exchanger.

For example, in a heat exchanger operated by mechanical vapor compression at one stage or effect, the secondary vapor is condensed on the same heat exchanger, whereas in a multi-effect configuration (either a multi-stage mechanical compression, or an MED), the secondary vapor is condensed on a heat exchanger arranged downstream, that is to say on the heat exchanger of the following effect.

In currently known heat exchangers, the primary vapor generated at an evaporation surface of a subassembly is caused to circulate in the heat exchanger through, in particular, any primary vapor space present in each of the sub-assemblies. In particular, this primary vapor circulates from the evaporation surface connected to a thermally conductive material from a subassembly to another conductive material, in particular to another evaporation surface, from another sub-assembly of the heat exchanger, said other sub-assembly being able to be a sub-assembly adjacent to said sub-assembly but not necessarily. Indeed, the vapor generated by the evaporation, referred to as primary vapor, of a part of the liquid to be treated or undergoing treatment is channeled by the primary vapor spaces until it exits the volume of the exchanger, then is provided by the process implemented on condensation surfaces of the heat exchanger. Thus, at the condensation surfaces, the vapors of the liquid during treatment, called secondary vapor, and in particular the water vapors, condense and produce the condensate, and the vapors of the compounds whose boiling point is lower than the temperature of the process constituting the non-condensable gases which must be extracted from the condensation spaces.

The primary vapor further circulates along paths available between the evaporation surfaces of the thermally conductive materials of the heat exchanger and the outside limits to the heat exchanger. For example, these paths may, or must, depending on the case, pass through primary vapor spaces linked to the evaporation surfaces of the other sub-assemblies.

To do this, the liquid to be treated is typically provided and distributed over the upper part of the heat exchanger and travels, under the effect of gravity and thanks to the design of the exchanger, all the evaporation surfaces of the exchanger until the treatment product is extracted or less partially in its lower part. During the implementation of the condensation process, only a part of the liquid to be treated is evaporated. For example, given that the salts contained in the liquid to be treated cannot be evaporated under the implementation conditions of the process, they remain in the liquid to be treated and this results in the salinity of the liquid to be treated increasing as the latter progresses over the surfaces of the exchanger during its movement between its upper part and its lower part.

It should be noted that using the currently known heat exchangers, it is possible to have an overall heat transfer coefficient of the order of 3000 to 6500 W/m²·K, a coefficient depending on the configuration and the size of the heat exchanger in question.

There are a multitude of types of heat exchangers that can be used in such processes. These heat exchangers are of different shapes and configurations. For example, the heat exchangers may comprise a plurality of layers of thermally conductive materials in the form of tube bundles (FIG. 13) or in the form of plates forming alternating evaporation and condensation chambers (FIG. 12). According to different configurations, the evaporation can thus be implemented inside these tubes or these chambers, or outside. It should also be noted that the heat exchanger tubes or chambers can be arranged horizontally or vertically or can be inclined.

It should be noted that heat exchangers designed to implement a thin film of falling water (TFF for Thin Falling Film) exhibit the best overall heat transfer coefficients but are greater in volume or form factor.

Furthermore, heat exchangers of the prior art that do not implement a thin falling film (TFF) are not compatible with uses where there is a low temperature differential between the condensing surfaces and the evaporation surfaces. For example, heat exchangers of the prior art that do not implement a thin falling film (TFF) may be those whose primary vapor spaces are at least partially filled with the liquid to be treated or undergoing treatment. For example, mention may be made of plate heat exchangers whose distances between two evaporation surfaces are small, in particular of the order of a few millimeters, and wherein the liquid to be treated is supplied in a turbulent and disorganized manner where the boiling phenomenon is accompanied by explosions of bubbles which mix the flows of liquid to be treated, or undergoing treatment, and of primary vapor. In fact, in these configurations, the primary vapors must escape from the volume of the heat exchanger by passing through a space at least partially filled with the liquid to be treated, or undergoing treatment, and this generates hydraulic pressure losses that require the implementation of a greater pressure differential, namely an associated temperature differential greater than 2 to 5° C.

In installations of the prior art implementing such a condensation evaporation process using at least one heat exchanger as described above, it is possible to produce both a condensate and also a concentrate. It should be noted that the installation generally also comprises other elements such as ducts that are necessary for collecting and extracting non-condensable gases, in particular. Furthermore, the condensate that is collected and extracted from such an installation may be intended for the domestic or industrial user. The concentrate, which, meanwhile, is collected and extracted from such an installation, is generally discharged into the natural environment.

The term concentrate refers, within the meaning of the present invention, to the portion of a liquid to be treated, or undergoing treatment, which is not evaporated during its progression over the evaporation and/or condensation surfaces of the heat exchanger, and whose salinity has increased. The concentrate is generally discarded.

The term "non-condensable gas" is understood in the present invention to mean, within the meaning of the present invention, the vapors of the compounds of a liquid to be treated, the boiling point of which is lower than the operating temperature of the process and which, consequently, have been evaporated but cannot condense under the conditions used.

For the purposes of the present invention, condensate refers to the product of the condensation of a water vapor generated by the evaporation of a part of the liquid to be treated. The condensate, which may also be referred to as a distillate when it is a single-effect unit, constitutes the product of the treatment.

Furthermore, the internal volume of the currently known heat exchangers consists of layers of thermally conductive materials having thicknesses of the order of 0.8 to 1.5 mm, in order to meet in particular three constraints:
  the mechanical strength of all of the large heat exchangers is partially provided by heat exchanger plates or tubes that are an integral part of the structure;
  since the thicknesses of the exterior walls implemented are important, manufacturers choose less expensive materials such as cupronickel, or cast aluminum. They reserve the more noble materials such as titanium or Duplex or Superduplex stainless steels for the most fragile small parts of heat exchangers, which are generally the upper watered parts which are subjected to corrosion and erosion;

the high thickness of the exterior walls also serves to integrate the phenomenon of decreasing the thickness of the exterior wall by erosion or corrosion in order to allow operation over a period of greater than 20 years or more.

However, in the current prior art, the performance of large heat exchangers is limited. For example, the specific exchange surface per unit of volume which characterizes them is, in the case of heat exchangers with thin falling film, limited to 40, or even 80 m²/m³, and their overall heat transfer coefficient is also limited to 3500 W/m²·K, or even to 6500 W/m²·K. Furthermore, the heat exchangers currently used are generally custom-built and made from a single piece in their enclosure and have significant volume and weight, making them difficult to disassemble or move.

One of the aims of the invention is to remedy the shortcomings of liquid desalination processes and devices or systems of the prior art.

DESCRIPTION OF THE INVENTION

The present invention relates to a heat exchanger comprising a plurality of sub-assemblies consisting in part of a layer of a thermally conductive material, the heat exchanger comprising:

evaporation surfaces configured to generate a primary vapor coming from a liquid to be treated, condensation surfaces configured to condense a secondary vapor into a condensate and to capture latent heat from condensation, the secondary vapor being the vapor to be condensed, wherein the thermally conductive material is configured to transfer at least a portion of the latent heat of condensation from one or more of the condensation surfaces to one or more of the evaporation surfaces, the heat exchanger being defined by a volume divided into a plurality of zones, the heat exchanger being characterized in that each of the zones comprises at least:

one of the sub-assemblies, and an extractor means configured to channel at least part of the primary vapor generated in the zone towards the outside of said volume.

It should be noted that the heat exchanger is in particular configured so that the primary vapor is under conditions which allow its evaporation and the secondary vapor, under conditions allowing its condensation. In particular, at a given sub-assembly, the secondary vapor is defined by a temperature and pressure greater than that of the primary vapor.

Zone, within the meaning of the present invention, is understood to mean a portion of the heat exchanger, which is virtually defined or materially dissociable, comprising at least one sub-assembly and an extractor means.

Two successive zones can be separated from each other by a part of the heat exchanger. In other words, two successive zones may or may not be adjacent.

A zone may comprise a plurality of sub-assemblies and a plurality of extractor means.

It should also be noted that a zone can take the form of a compartment.

A compartment, within the meaning of the present invention, is understood to mean a portion of the heat exchanger that is materially dissociable.

For example, a compartment or a zone may consist, according to the invention, of one or more layers of a thermally conductive material, one or more evaporation surfaces, one or more condensation surfaces and one or more extractor means.

A thermally conductive material, within the meaning of the present invention, is understood to mean a material using which it is possible to maintain both the evaporation phenomenon and also the condensation of a liquid to be treated, namely a material whose thermal properties are sufficient under the implementation conditions of the heat exchanger to transmit, from a condensation surface to the evaporation surface, at least the latent heat from condensation generated per unit of area. For example, as a thermally conductive material also having sufficient qualities of resistance to corrosion induced by the liquid to be treated, mention may be made of cast aluminum, cupronickel, stainless steels, titanium, and composite materials with improved thermal conductivity.

According to the invention, the overall heat transfer coefficient of the heat exchanger is increased. In particular, the extractor means make it possible to extract at least some of the primary vapor generated by an evaporation surface of a given sub-assembly before that vapor moves into a primary vapor space of an adjacent sub-assembly. Indeed, the evaporation phenomenon is encouraged if the vapor atmosphere adjacent to a given evaporation surface is less loaded with saturated vapor. Thus, by extracting said part at least of the directly primary vapor where it is generated, or in different zones of the heat exchanger, either at any point, or overall, the saturated primary vapor pressure in the vicinity of the evaporation surfaces is reduced. Also, by channeling the primary vapor, for example through a duct independent of the primary vapor spaces, the creation of pressure drops within said primary vapor space, which have the effect of decreasing in certain locations the negative pressure differential that is necessary for the evaporation phenomenon, is avoided. The channeling or extraction of the primary vapor therefore promotes the homogeneity of the negative pressure differentials and tends to eliminate the reduction in this necessary negative differential. This therefore not only increases the overall heat transfer coefficient of the heat exchanger, but also allows the heat exchanger to operate with very low pressure and temperature differentials, which reduces the energy consumption of the process implementing such a heat exchanger. However, it should be noted that the increase in overall performance of the heat exchanger is variable according to the embodiment of the vapor-extractor means.

In particular, the extractor means is configured to channel at least some of the primary vapor generated close to an evaporation surface of a sub-assembly and to discharge it outside the heat exchanger without this primary vapor in particular passing in front of the evaporation surfaces of other adjacent sub-assemblies.

In particular, the more complex and branched the extractor means, the more the performance of the heat exchanger can be increased. An equilibrium between the implementation costs of a more or less branched extractor means and the desired performance improvements relating to the heat exchanger will have to be chosen for each application and by each manufacturer.

For example, as extractor means, it is possible to have at least one tube and/or a parallelepiped chamber which can be formed of two main plates, the tube and/or the chamber being pierced with holes inserted into at least one primary vapor space within the volume of the exchanger, or at least one tube, one end of which is used to suck and extract from the primary vapor within the volume of the exchanger, or any other profile pierced with orifices arranged according to a similar principle and which may be of any shape.

Furthermore, using the extractor means, it is possible to obtain a heat exchanger having a smaller specific volume (volume of the heat exchanger per exchange surface) than those currently used, mainly during the implementation of the thin-film heat exchangers or those operating at a low temperature differential. Indeed, it is now possible to propose a compact, dense heat exchanger by decreasing the space contained between two evaporation surfaces of a given sub-assembly to only a few millimeters while maintaining the maximum overall heat transfer coefficient, which was impossible with current heat exchangers. Indeed, currently, spaced apart and large heat exchangers, that is, having a volume of the order of 1 m$^3$ or more, for example with horizontal tubes of rows spaced apart by approximately 20 to 30 mm, and/or more compact heat exchangers, for example plates, but of small sizes, that is to say having a volume less than or equal to 0.5 m$^3$, make it possible to maintain performance levels ranging from 3500 W/m$^2$·K or even up to 6500 W/m$^2$·K.

The heat exchanger according to the invention can be defined by a specific volume smaller than those of the heat exchangers currently used and made based on materials characterized by mechanical strengths lower than the materials currently used in heat exchangers. Indeed, the materials used in the heat exchanger according to the invention must withstand mechanical stresses lower than those to which the materials used in current heat exchangers must withstand.

In particular, it is therefore possible to replace the materials of the layers of thermally conductive material with more noble materials. Indeed, currently for large-size exchangers, with thin falling film for example, noble materials such as titanium or Duplex or Superduplex stainless steels are reserved for the sensitive parts of the heat exchanger, for example at the upper part of the heat exchanger through which the liquid to be treated is watered, this upper part being subjected to corrosion and erosion. But with the manufacturing savings achieved using the present invention, it is now possible to manufacture a heat exchanger having layers entirely composed of the same noble material.

It should be noted that the heat exchanger according to the invention can preferably be a heat exchanger of the thin falling film type.

Furthermore, the heat exchanger according to the invention may comprise a plurality of small compartments as zones. In this case, the thicknesses of layers of a thermally conductive material that were not sufficient on large volumes relating to the current heat exchangers now are so in the invention. A greater layer density of thermally conductive material of lower thickness therefore makes it possible to construct sub-assemblies of small dimensions which can be integrated into compartments, which are light and which do not require a supporting structure other than, for example, lateral flanges. Said lateral flanges also facilitate the connection between each compartment.

In a particular embodiment of the invention, it is advantageous to optimally extract the primary vapor. Therefore, in this embodiment, each of the zones may comprise several extractor means.

In a particular embodiment of the invention, it is advantageous to collect the primary vapor extracted by the extractor means in order to reinject it into the heat exchanger or otherwise use it. Therefore, in this embodiment, each zone may further comprise a collecting means connected to one or more extractor means of said zone, the collecting means being configured to collect the primary vapor extracted by said one or more extractor means of said zone.

In this particular embodiment of the invention, it is advantageous to use the least possible collecting means to facilitate the production of such a heat exchanger while limiting the costs related to the use of a large number of collecting means. Therefore, in this embodiment, the collecting means can preferably be interconnected to the collecting means of another of said zones, the interconnected collecting means being further connected to a duct configured to channel the primary vapor collected by the interconnected collecting means towards the outside of said volume.

In a particular embodiment of the invention, a maximum of the volume of the heat exchanger is desired to be able to contain the largest number of sub-assemblies. Therefore, in this embodiment, two of said successive zones may be adjacent.

In one particular embodiment of the invention, it is advantageous to further facilitate the production and maintenance of the heat exchanger. Therefore, in this embodiment, two of said successive zones may be equal.

For the purposes of the present invention, two equal zones are understood to mean two zones that comprise the same elements and are configured in the same way.

In a particular embodiment of the invention, it is advantageous to use zones, for example of the compartment type, and to connect these compartments to one another so that a second compartment connected downstream of a first compartment can convey and extract its primary vapor. In this embodiment, each of said zones may further comprise a means for introducing the secondary vapor.

In this particular embodiment of the invention, it is advantageous for each zone, for example of the compartment type, to be autonomous. Therefore, in this embodiment, each of the zones may preferably further comprise a removal means configured to remove the condensate and non-condensable gases.

It should be noted that each of the layers of a thermally conductive material may comprise an evaporation surface and a condensation surface, the evaporation surface being opposite the condensation surface.

The layer of a thermally conductive material may be in any form, in particular in the form of a two-dimensional or three-dimensional object.

The term two-dimensional object is understood to mean, within the meaning of the present invention, an element whose length and width are much greater than the thickness. For example, a two-dimensional object may be a film, a sheet, or a plate.

The term three-dimensional object is understood to mean, within the meaning of the present invention, an object with volume that is not a two-dimensional object. For example, a three-dimensional object may be a tube, a sphere, a parallelepiped.

In a particular embodiment of the invention, it is advantageous to use noble materials without increasing the costs related to such a use. Therefore, in this embodiment, the thickness of said layer of a thermally conductive material is less than 400 μm, preferably less than 300 μm, or even preferably less than 200 μm.

For example, the thickness of the layer of thermally conductive material may be between 25 μm and 100 μm when this material is a noble metal, and may be between 40 μm and 250 μm when this material is made of composite plastic.

In a particular embodiment of the invention, the structure of the heat exchanger is advantageously equivalent to that of the heat exchangers currently used. Therefore, in this embodiment, the layer of a thermally conductive material may be in the form of a plate comprising one of the evaporation surfaces and one of the condensation surfaces.

In this particular embodiment of the invention, when the layer of a thermally conductive material is in the form of a plate, it is advantageous to produce a large-size, very compact heat exchanger, exhibiting optimum overall heat transfer coefficients ranging up to 6500 W/m²·K, or 7000 to 8000 W/m²·K. For information, high-performance large-size heat exchangers according to the prior art have a specific exchange surface area per unit of volume on the order of 40 to 60 m²/m³ while using the plate heat exchanger according to the invention, it is possible to have a specific exchange surface area per unit of volume that is much greater, which may range up to 100 m²/m³, or even 200 m²/m³ or even 250 m²/m³. This significant increase in specific surface area per unit of volume, combined with maintaining a high heat transfer capacity, makes it possible to substantially reduce the size and cost of the distillation facilities implementing this type of heat exchanger. Therefore, in this embodiment, including by implementing a thin falling film, two adjacent plates may preferably be spaced apart by a distance d between 2 mm and 15 mm. In the space defined by this distance d can be found the extractor means, but not necessarily. The distance d may preferably be between 2 mm and 7 mm. Said extractor means may take the form of an extraction chamber whose thickness, namely the distance of between the exterior walls of the two main plates that constitute it is between 0.5 and 5 mm, the thickness of each of said plates potentially being between 25 and 500 μm.

The heat exchanger according to the invention also has several advantages if working with a low temperature differential applied between the condensing surface and the evaporation surface of the same plate, that is a low temperature differential between the secondary and primary vapor. It should be noted that current heat exchangers typically work with temperature differentials much greater than 1° C., often between 2.0 and 2.5° C., or even greater than or equal to approximately 5° C. for the heat exchangers that do not use thin falling film. The saturated-vapor temperature differentials are associated according to the laws of physics with pressure differentials, and a temperature differential between 2.0 and 2.5° C. corresponds to a compression factor, in the case of an implementation using single-effect MVC, respectively between 1.11 and 1.14. Such temperature and pressure differentials are governed by the heat exchange size and capacity of the heat exchangers currently used. In a particular embodiment of the invention, the heat exchanger has, for its part, a temperature differential applied between said condensation surface and said evaporation surface of the same plate, between 0.4 and 1.2° C. when the liquid to be treated is seawater, and 0.1 and 0.9° C. when the liquid to be treated is brackish water. Such differentials are possible thanks to the use of extractor means which make it possible to install a very large exchange capacity in a typical volume without affecting or decreasing the negative pressure differential nor increasing the saturated vapor saturation, which are two phenomena that reduce the overall heat transfer coefficient of the exchangers, or even prevent its correct operation at temperature differentials close to the boiling-point elevation. In the case of seawater, with a process operating with a vapor temperature approximately equal to 45° C. for example, the boiling-point elevation is approximately equal to 0.4° C.; if it is desired to use the evaporation-condensation process with a total temperature differential between the condensation surface and the saturated primary vapor of between 0.5° C. and 0.7° C. for example, the effective temperature differential between the two faces of a layer will therefore be between 0.1° C. and 0.3° C. If, according to the prior art, a large-size heat exchanger is operated without extractor means with an effective temperature differential equal to 0.3° C., for example, and if the losses of hydraulic pressure on certain paths of the primary vapors are as they correspond, according to Mollier, to a saturated vapor temperature differential of, for example, 0.1° C. or more, the heat exchange capacity of the heat exchanger would be reduced by one-third, or more, at the locations concerned. By virtue of the invention, we can operate large and compact heat exchangers with an effective temperature differential as low as for example 0.1° C., without loss of efficiency.

In a preferred mode of the invention, the heat exchanger is used with seawater at 35 g/L, a conversion rate of 30 to 40%, an equilibrium temperature, that is to say of primary vapor, from 40 to 45° C., an absolute pressure of the chamber of 0.05 to 0.1 bar, and an effective temperature differential between the two evaporation and condensation surfaces of a layer of thermally conductive material between 0.1 to 0.3° C., which corresponds to a total temperature differential between the condensation surface and the saturated primary vapor of 0.5 to 0.7° C.

In other embodiments of the invention, the heat exchanger can be used effectively with effective temperature differentials as low as 0.1 to 0.5° C. for any other type of water to be treated, the baseline deviation of which is different, according to the same calculation mode to determine the total temperature differential of each different configuration. Thus, the heat exchanger is preferably characterized in that the effective temperature differential between the condensation surface and the evaporation surface of a layer of a thermally conductive material may be less than 0.5° C.

In a particular embodiment of the invention, it is advantageous for the heat exchanger to be composed of a number of zones, for example of the compartment type, these compartments being single-piece and self-supporting and comprise layers of thermally conductive materials having very small thicknesses, in particular less than 250 μm, and very close to each other, in particular a distance d less than 2 to 7 mm. Therefore, in this embodiment, the ratio between the number of zones, which may be compartments, and said volume is between 4 and several thousand.

A self-supporting compartment, within the meaning of the present invention, is understood to mean an assembly by welding or bonding of layers of thermally conductive materials constituting at least part of the heat exchanger, or a compartment, the assembly holding itself together alone or using lateral flanges welded or glued, which can be transported, installed and implemented without deforming or requiring a reinforcing means or external support.

Due to the design of a heat exchanger by assembling zones, for example of the compartment type, according to a preferred embodiment, these zones have a cross section of smaller size than that of an access door to the enclosure of the manhole type, the inside diameter of which is typically 600 to 800 mm. This ability allows one or two men only, without bulky or special tools, and without having to open the entire face of the enclosure, or at least a large part of the latter, to disassemble the heat exchanger and to transport the compartments to a maintenance workshop.

According to another aspect, the invention relates to the use of a heat exchanger as described above in a process implementing mechanical vapor compression.

Preferably, the mechanical vapor compression can be single-effect.

The invention will be better understood on reading the following description, which is provided solely by way of example, and with reference to the appended figures in which:

FIG. 1 schematically shows a part of a heat exchanger comprising plates according to one embodiment of the invention;

FIG. 2 schematically shows an extractor means comprised in a heat exchanger according to one embodiment of the invention;

FIG. 3 schematically shows a part of a heat exchanger comprising tubes according to one embodiment of the invention;

FIG. 4 schematically shows an extractor means comprised in a heat exchanger according to one embodiment of the invention;

FIG. 5 schematically shows a part of a heat exchanger according to one embodiment of the invention;

FIG. 6A and FIG. 6B schematically show sections of a heat exchanger according to one embodiment of the invention;

FIG. 7 is a diagram of a heat exchanger according to one embodiment of the invention;

FIG. 8 shows a heat exchanger according to one embodiment of the invention which implements materially dissociable sub-assemblies of the compartment type;

FIG. 9A, FIG. 9B and FIG. 9C represent views of a sub-assembly of a simplified compartment and its compatibility in a heat exchanger according to one embodiment of the invention;

FIG. 10 schematically shows a part of a heat exchanger comprising inclined plates according to one embodiment of the invention;

FIG. 11A schematically shows a heat exchanger comprising an assembly of compartments according to one embodiment of the invention;

FIG. 11B schematically shows a heat exchanger comprising tubes according to one embodiment of the invention;

FIG. 12 shows a part of a heat exchanger comprising plates according to the prior art; and FIG. 13 shows a part of a heat exchanger comprising tubes according to the prior art.

The following description presents parts at least of heat exchangers, of the evaporator-condenser type, produced according to the invention and comprising a plurality of zones. The heat exchanger is configured to desalinate seawater. Each zone is either a virtual division or a compartment materially separable from the heat exchanger and consists of a plurality of elements of the heat exchanger. The assembly of a plurality of zones, for example in an array, forms the heat exchanger. The heat exchanger is delimited by its volume Vec. Some of the zones or compartments may for example be stacked on top of one another.

The heat exchanger consists of several sub-assemblies which are each made up of a layer of a thermally conductive material. This layer of a thermally conductive material comprises an evaporation surface configured to generate, in a vapor space to be evaporated or primary vapor space, a primary vapor coming from seawater, and a condensing surface configured to condense, in a vapor space to be condensed or secondary vapor space, a secondary vapor into condensate and to generate latent heat from condensation, the secondary vapor being the vapor to be condensed.

It should be noted that each sub-assembly consists in part of a layer of a thermally conductive material having a thickness of less than 400 μm, for example made of titanium, duplex or superduplex steel or equivalent, or composite plastic with improved thermal performance.

In particular, for a layer of a thermally conductive material, each evaporation surface is opposite each condensation surface. Furthermore, the thermally conductive material is configured to transfer at least part of the latent condensation heat from the condensation surface to the evaporation surface of a given sub-assembly.

The heat exchanger further comprises an upper part through which the seawater is introduced. Thus, the seawater to be desalinated is distributed over the upper part of the heat exchanger and percolated by gravity on all the evaporation surfaces of the sub-assemblies. For example, take the case of two stacked sub-assemblies, a first sub-assembly being arranged on a second sub-assembly. In this configuration, the seawater who is growing by gravity at the bottom part of the first sub-assembly waters the upper part of the surfaces to be wetted from the second subassembly, and so on for the other optional sub-assemblies, until the bottom of the heat exchanger is reached in order to constitute the concentrate.

The invention relates to all possible configurations of heat exchangers, but in order to present an intelligible description, the following examples focus on heat exchangers employing thermally conductive materials in the form of plates or in the form of a bundle of tubes. The following examples show configurations with vertical plates or horizontal tubes, with condensation inside the chambers or tubes, but the invention can be implemented with any type of configuration. In some configurations, the plates may or may not be parallel.

FIG. 1 shows a part of a heat exchanger with vertical plates. In particular, each of the vertical plates represents a first part of the heat exchanger. Each of these first parts represents a continuous-line evaporation-condensation chamber 100. Each evaporation-condensation chamber 100 comprises in particular a thermally conductive material as well as an evaporation surface and a condensation surface. Each of these evaporation-condensation chambers 100 also comprises also a primary vapor space located on the side of the evaporation surface and a secondary vapor space located on the side of the condensing surface. Therefore, the primary vapor is generated on the evaporation surface side.

In all the figures, the dashed lines represent primary vapor extraction chambers 200. As shown in FIG. 2, each of these extraction chambers 200 comprises at least one extractor means 210 which is shown as a rectangular parallelepiped comprising in particular two large faces, in particular two main plates, each pierced with a network of holes 220, the extractor means 210 being inserted into at least one primary vapor space within the volume of the exchanger.

It should also be noted that the distance d between an evaporation-condensation chamber 100 and an adjacent extraction chamber 200 is between 2 mm and 7 mm. The thickness of an extraction chamber 200, or more precisely the distance that separates the outer ends of the two main plates which constitutes it, is between 0.5 and 10 mm; the thickness of said two main plates being between 25 μm and 500 μm.

In particular, according to one embodiment, the extraction chamber 200 is located between two evaporation surfaces of two adjacent sub-assemblies, and is connected to a vacuum means that can further be connected to a system of ducts representing a primary vapor suction network. This extraction chamber 200 shown as a dashed line constitutes the second part of the heat exchanger. It should be noted that each of the extraction chambers 200 is shown in dashed lines in the figures for the sole purpose of visually differentiating the evaporation-condensation chambers 100.

In particular, as shown in FIG. 1, each primary vapor extraction chamber 200 is installed between two evaporation-condensation chambers 100. Using the extraction chamber 200, at least part of this primary vapor is then channeled, that is to say is collected and directed toward other elements to be subsequently processed (for example a recompression in the case of MVC, or a transfer to a next effect or stage in the case of MED or MVC with multiple effects).

Furthermore, according to the example shown in this FIG. 1, a means for introducing the secondary vapor (not shown) ensures the delivery of the secondary vapor inside each of the evaporation-condensation chambers 100, in particular in its condensing space. Thus, in each of the zones as defined above, primary vapor is generated by the evaporation-condensation chamber 100 and also extraction thereof by the extraction chamber 200. The generated primary vapor is channeled and extracted outside the heat exchanger without passing through the evaporation surfaces of other zones.

It should be noted that the smallest possible zone in FIG. 1 is defined by a virtual subdivision of the exchanger into rectangular parallelepipeds. Each smaller zone comprises a single hole pierced in an extraction chamber 200, a part of the adjacent evaporation-condensation chamber 100, and volumes necessary around these chambers in order to fit the virtual subdivision into a continuous network. In this way, said smallest zone indeed comprises at least one layer of heat-conducting material, an evaporation face and a primary vapor space, a condensation face and a secondary vapor space, an extractor means consisting of said single pierced hole, and a duct (consisting of the extraction chamber which is itself connected to a collecting means) which extracts the primary vapor out from the exchanger.

In an alternative embodiment not shown, each of the zones may comprise a plurality of extractor means. Furthermore, each zone may also further comprise a collecting means connected to one or more extractor means of the zone. In this configuration, the collecting means is configured to collect the primary vapor extracted by said one or more extractor means of the zone.

In a variant embodiment that is not also shown, the collecting means of one of said zones is interconnected to the collecting means of another of said zones. In this configuration, the interconnected collecting means are further connected to a duct configured to channel the primary vapor collected by the interconnected collecting means towards the outside of the volume defining the heat exchanger, that is outside the inner volume delimited by the outer walls of the heat exchanger.

In an alternative embodiment not also shown, each of the zones further comprises a removal means configured to remove the condensate and non-condensable gases.

Each of the zones as defined further comprises a means for extracting the primary vapor to ensure its transport to the extractor means of one or more other zones.

Thus, according to these examples, the primary vapors are locally channeled and conveyed towards the outside of the heat exchanger.

FIGS. 3 and 4 show another implementation of the same principle with evaporation-condensation chambers 100 that are tube-shaped rather than plate-shaped as is shown in FIGS. 1 and 2.

In the same way as with plate heat exchangers, it is possible to insert a primary vapor extraction chamber 200 between two columns 300 of tubes of the heat exchanger, when the latter is made in the form of tube bundles. As shown in FIG. 4, the primary vapor extraction means can be constructed as an assembly of tubes 310 each pierced with a network of holes 320 that follow one direction, or the same direction as that of the columns 300 of tubes of the heat exchanger. The assembly of tubes is connected to a collecting means in the same way as the vapor extraction chambers 200.

In the case where the liquid to be treated is indiscriminately sprinkled over the entire upper face of the heat exchanger, it is necessary to install protections to prevent the liquid to be treated from wetting the extractor means. These protections may take the form of profiles, for example with an open downward V-shaped cross-section installed above each extraction chamber 200, so that said profiles return water sprinkled onto the thermally conductive layers of the heat exchanger.

FIG. 5 shows an assembly of the heat exchanger 400 according to FIG. 1, provided with lateral flanges (a left flange 410 and a right flange 420). The assembly is made of two parts. The first part is a successive stacking of several bonded or welded assemblies, each composed of a layer of a thermally conductive material, then of a spacer closing the condensation space, then of a second layer of a thermally conductive material, then of a spacer closing the primary vapor space and provided with an extraction chamber 200. The second part comprises: a primary vapor collecting means, a means for introducing the secondary vapor, a means for removing condensate and non-condensable gases. If the longitudinal cross-section of a spacer closing the condensing space (FIG. 6A) and the representation of a spacer closing the primary vapor space and provided with an extraction chamber 200 (FIG. 6B) is observed, it is understood that the right flange 420 in FIG. 5 makes it possible to introduce the secondary vapor into the evaporation-condensation chambers 100, and that the left flange 410, in its central part, makes it possible to collect the primary vapor, in its lower part, makes it possible to collect the condensate and the heavy non-condensable gases, and in its upper part, to collect the light non-condensable gases.

FIG. 7 shows an adaptation of the exchanger according to the example shown in FIG. 5 where the evaporation-condensation chambers 100 are tubular as shown in FIGS. 3 and 4.

FIG. 8 shows another embodiment of the invention which implements materially dissociable zones or compartments 500. The heat exchanger presented is of the same size, of the same exchange capacity, and of the same volume as that of FIG. 5. The heat exchanger of FIG. 8 consists of several compartments 500 (36 in our example) physically distinct and stackable. The compartments 500 may also itself consist of a large number of sub-zones. The compartments 500 can also be produced in an identical manner to a heat exchanger according to FIG. 5 of reduced size. Each compartment 500 is provided with its own primary vapor collector which is preferably connected to each extractor means of the other compartments. Each compartment 500 can also comprise a set of ducts that can be its own sub-means for introducing the secondary vapor, which may be the right flange 420, and the removal of condensate and non-condensable gases which can be the left flange 410. The sub-means of the compartments 500 are, in an optimized embodiment, interconnected in their upper and lower parts of the stacks to form ducts 510 and 520 which are themselves connected to the main collectors 550 of vapors, distillate and non-condensable gases of the heat exchanger. Each of the ducts 510 and 520 is formed by a vertical or horizontal assembly, respectively, of the left flanges 410 and right flanges 420. The ducts 510 are ducts for extracting primary vapor, condensate and non-condensable gases. The ducts 520 are secondary vapor supply ducts.

FIG. 9A, which is a perspective view of a compartment 500, does not show the evaporation-condensation chambers 100 to facilitate reading. FIG. 9A shows the left flange 410 of a simplified compartment, where the means for extracting the primary vapor is reduced to an array 430 of slits or orifices pierced in the left flange 410 suitable for collecting the primary vapor, without it being necessary for an extraction chamber 200 to be present between each evaporation-condensation chamber 100 as shown in FIG. 1.

FIGS. 9B and 9C show horizontal sections of the simplified compartment of FIG. 9A. They show that this simplified configuration is advantageously compatible with an assembly of plate-based evaporation-condensation chambers 100, the sections of which increase on the primary vapor path and decrease on the secondary vapor path.

FIG. 10 shows an example of implementation of the invention for an assembly of inclined evaporation-condensation plates, where only one face of the resulting evaporation-condensation chambers 100 is thermally active. Indeed, in this configuration, it is the evaporation-condensation chamber 100 adjacent to the one considered that forms the primary vapor extraction chamber 200.

FIG. 11A shows an assembly of simplified compartments; this representation clearly shows the arrays 430 of slits (dashed lines, appearing as darker) of primary vapor inserted within the heat exchanger. The arrays 430 of slits are, for example, directly connected to the extraction ducts 510, formed by the flanges of the compartments.

FIG. 11B shows a heat exchanger made of a bundle of horizontal tubes, wherein only a few vapor extraction means have been placed (dashed lines, appearing as darker) therein. This heat exchanger according to a particular embodiment of the invention consists of a plurality of virtual zones, each zone comprising at least one vapor extraction hole collected and extracted outside the volume of the heat exchanger. This example shows a partial implementation of the invention by installing only a few collectors or primary vapor extractor means within the heat exchanger, with the aim of improving performance only partially but at a lower cost.

The invention claimed is:

1. A heat exchanger comprising a plurality of sub-assemblies consisting in part of a layer of a thermally conductive material, said heat exchanger comprising:

evaporation surfaces configured to generate a primary vapor coming from a liquid to be treated, condensation surfaces configured to condense a secondary vapor into a condensate and to capture latent heat from condensation, the secondary vapor being the vapor to be condensed, wherein said thermally conductive material is configured to transfer at least a portion of the latent heat of condensation from one or more of said condensation surfaces to one or more of said evaporation surfaces, said heat exchanger being defined by a volume divided into a plurality of zones, said heat exchanger being characterized in that each of said zones comprises at least:

one of said sub-assemblies, and an extractor means configured to channel at least part of said primary vapor generated in said zone towards the outside of said volume, wherein the extractor means are configured to discharge the primary vapor outside of said volume without passing in front of the evaporation surfaces of other adjacent sub-assemblies.

2. The heat exchanger according to claim 1, characterized in that each of said zones comprises multiple extractor means.

3. The heat exchanger according to claim 1, characterized in that each zone further comprises a collecting means connected to one or more extractor means of said zone, said collecting means being configured to collect said primary vapor extracted by said one or more extractor means of said zone.

4. The heat exchanger according to claim 3, characterized in that said collecting means of one of said zones is interconnected to said collecting means of another of said zones, said interconnected collecting means further being connected to a duct configured to channel said primary vapor collected by said interconnected collecting means towards the outside of said volume.

5. The heat exchanger according to claim 1, characterized in that two of said successive zones are adjacent.

6. The heat exchanger according to claim 1, characterized in that two of said successive zones are equal.

7. The heat exchanger according to claim 1, characterized in that each of said zones further comprises a means for introducing said secondary vapor.

8. The heat exchanger according to claim 7, characterized in that each of said zones further comprises a removal means configured to remove said condensate and non-condensable gases.

9. The heat exchanger according to claim 1, characterized in that the thickness of said layer of a thermally conductive material is less than 400 μm.

10. The heat exchanger according to claim 1, characterized in that said layer of a thermally conductive material is in the form of a plate comprising one of said evaporation surfaces and one of said condensation surfaces.

11. The heat exchanger according to claim 10, characterized in that two adjacent plates are spaced apart by a distance d between 2 mm and 10 mm.

12. The heat exchanger according to claim 11, characterized in that it has a specific surface area per unit of volume greater than 100 $m^2/m^3$.

13. The heat exchanger according to claim 1, characterized in that the extractor means are configured so that the effective temperature differential between the condensation surface and the evaporation surface of a layer of a thermally conductive material is less than 0.5° C.

14. The heat exchanger according to claim 1, characterized in that it is a heat exchanger of the thin falling film type.

15. A method comprising:

evaporating the liquid using the heat exchanger according to claim 1;

compressing a vapor generating from the evaporating; and condensing the compressed vapor.

16. The method according to claim 15, whereby the compressing of the vapor comprises mechanical vapor compression and wherein the mechanical vapor compression is single-effect.

* * * * *